US009495283B2

(12) United States Patent
Alger et al.

(10) Patent No.: US 9,495,283 B2
(45) Date of Patent: Nov. 15, 2016

(54) SYSTEM AND METHOD FOR SERVER MIGRATION SYNCHRONIZATION

(71) Applicant: III HOLDINGS 1, LLC, Wilmington, DE (US)

(72) Inventors: James Alger, Coral Springs, FL (US); Masood Reza, Plantation, FL (US); Judy Romanowski, Plantation, FL (US); Jerold R. Treger, Light House Pt, FL (US); Lora L. Wright, Hollywood, FL (US)

(73) Assignee: III Holdings 1, LLC, Wilmington, DE (US)

( * ) Notice: Subject to any disclaimer, the term of this patent is extended or adjusted under 35 U.S.C. 154(b) by 15 days.

(21) Appl. No.: 14/216,187

(22) Filed: Mar. 17, 2014

(65) Prior Publication Data

US 2014/0201716 A1    Jul. 17, 2014

Related U.S. Application Data

(63) Continuation of application No. 11/537,634, filed on Sep. 30, 2006, now Pat. No. 8,719,787.

(51) Int. Cl.
*G06F 11/36* (2006.01)
*G06F 9/44* (2006.01)
*G06F 9/445* (2006.01)

(52) U.S. Cl.
CPC ....... *G06F 11/3696* (2013.01); *G06F 9/44505* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,909,689 A * | 6/1999 | Van Ryzin | |
| 6,223,343 B1 | 4/2001 | Hopwood et al. | |
| 6,701,514 B1 | 3/2004 | Haswell et al. | |
| 6,959,433 B1 | 10/2005 | Morales et al. | |
| 7,028,290 B2 | 4/2006 | Srivastava et al. | |
| 7,069,541 B2 | 6/2006 | Dougherty et al. | |
| 7,131,112 B1 * | 10/2006 | Bartz | G06F 8/71 707/999.201 |
| 7,165,189 B1 | 1/2007 | Lakkapragada et al. | |

(Continued)

OTHER PUBLICATIONS

Denaro et al .Early Performance Testing of Distributed Software Applications. Proceedings of the 4th international workshop on Software and performance, Jan. 2004, pp. 94-103, Retrieved on [Jul. 6, 2016] Retrieved from the Internet: URL<http://dl.acm.org/citation.cfm?id=974059>.*

Alvaro et al. Orion-RE: A Component-Based Software Reengineering Environment.Proceedings of the 10th Working Conference on Reverse Engineering (WCRE'03), 2003 Retrieved on [Jul. 6, 2016] Retrieved from the Internet: URL<http://ieeexplore.ieee.org/stamp/stamp.jsp?tp=&arnumber=1287255>.*

(Continued)

*Primary Examiner* — Thuy Dao
*Assistant Examiner* — Cheneca Smith
(74) *Attorney, Agent, or Firm* — Meyertons, Hood, Kivlin, Kowert & Goetzel, P.C.

(57) ABSTRACT

A system and method for managing the migration of software components among test servers that form a distributed software test environment to ensure that the software components in each of the test servers represent a production environment except for software components being tested. The system further ensures that component changes rolled out into production are not overridden when multiple update requests are made for the same component.

18 Claims, 11 Drawing Sheets

(56) References Cited

U.S. PATENT DOCUMENTS

| | | | |
|---|---|---|---|
| 7,213,231 B1 | 5/2007 | Bandhole et al. | |
| 7,299,382 B2 | 11/2007 | Jorapur | |
| 7,428,726 B1 | 9/2008 | Cowan et al. | |
| 7,437,713 B2* | 10/2008 | Beardsley | G06F 11/3664 717/103 |
| 7,490,319 B2 | 2/2009 | Blackwell et al. | |
| 7,640,533 B1* | 12/2009 | Lottero | G06F 8/71 717/108 |
| 2003/0131285 A1* | 7/2003 | Beardsley | G06F 11/3664 714/38.14 |
| 2003/0182652 A1 | 9/2003 | Custodio | |
| 2004/0060044 A1* | 3/2004 | Das | G06F 8/65 717/171 |
| 2004/0073890 A1* | 4/2004 | Johnson | G06F 11/368 717/124 |
| 2004/0261053 A1 | 12/2004 | Dougherty et al. | |
| 2004/0261070 A1 | 12/2004 | Miller et al. | |
| 2005/0229159 A1 | 10/2005 | Haba et al. | |
| 2006/0075398 A1* | 4/2006 | Bennett | G06F 8/61 717/170 |
| 2006/0282823 A1 | 12/2006 | Li et al. | |
| 2007/0083859 A1* | 4/2007 | Fussell | G06F 8/71 717/168 |
| 2007/0168970 A1 | 7/2007 | Li et al. | |
| 2008/0127089 A1 | 5/2008 | Peretz et al. | |
| 2011/0107299 A1 | 5/2011 | Dehaan | |

OTHER PUBLICATIONS

Denaro et al.; Early Performance Testing of Distributed Software Applications. Proceedings of the 4th international workshop on Software and performance. Jan. 2004, pp. 94-103, retrieved on [Jan. 10, 2014] retrieved from the Internet: URL<http://dl.acm.org/citation.cfm?id=974059>.

Alvaro et al. Orion-RE: A Component-Based Software Reengineering Environment. Proceedings of the 10th Workshing Conference on Reverse Engineering (WCRE'03), 2003 Retrieved on [Jan. 10, 2013] Retrieved from the Internet: URL<http://ieeexplore.ieee.org/stamp/stamp.jsp?tp=&arnumber=1287255>.

USPTO; Office Action dated May 26, 2011 in U.S. Appl. No. 11/537,634.

USPTO; Final Office Action dated Nov. 4, 2011 in U.S. Appl. No. 11/537,634.

USPTO; Advisory Action dated Dec. 30, 2011 in U.S. Appl. No. 11/537,634.

USPTO; Office Action dated Feb. 29, 2012 in U.S. Appl. No. 11/537,634.

USPTO; Final Office Action dated Sep. 14, 2012 in U.S. Appl. No. 11/537,634.

USPTO; Advisory Action dated Nov. 30, 2012 in U.S. Appl. No. 11/537,634.

USPTO; Office Action dated May 21, 2013 in U.S. Appl. No. 11/537,634.

USPTO; Notice of Allowance dated Jan. 22, 2014 in U.S. Appl. No. 11/537,634.

* cited by examiner

Example

Production is defined as $C_1, C_2, C_3, C_4, C_5, C_6, C_7$

Programmer has the following pkgs in the following environments:

E1 Environment:  Pkg 1      $C_1 = R$
                 $C_2 = W$
                 $C_1 = R$ Pkg 2      $C_3 = W$
                 $C_5 = R$

E1 = $C_1, C_2^M, C_3^M, C_4, C_5, C_6, C_7$

E2 Environment: Pkg 3       $C_5 = W$
                $C_6 = R$

E2 = $C_1, C_2, C_3, C_4, C_5^M, C_6, C_7$

Note:
- Pkg 1 when complete in testing in E1 can migrate to the E2 environment.
- Pkg 2 cannot migrate to E2 because it contains a component $C_5$ (Read) that is used by Pkg3 in E2 for Write.
- Once Pkg3 migrates from the E2 environment, the $C_5^M$ component on E2 will be replaced with the Production version. Then Pkg2 can migrate to E2.

FIGURE 3A

Example: Migration profile is defined; may have 1→ n profiles

Example of two paths for an application:
1) Start – E1 – E2 – E3 – End
2) Start – E2 – E3 – End

SYSTEM AND METHOD FOR SERVER MIGRATION SYNCHRONIZATION

CROSS-REFERENCE TO RELATED APPLICATIONS

This application is a continuation of, claims priority to and the benefit of, U.S. Ser. No. 11/537,634 filed Sep. 30, 2006, now U.S. Pat. No. 8,719,787, and entitled "SYSTEM AND METHOD FOR SERVER MIGRATION SYNCHRONIZATION," which is incorporated herein in its entirety.

BACKGROUND OF THE INVENTION

1. Field of the Invention

The present invention generally relates to a system and method for server migration synchronization within a software development process, and more particularly to a system and method for managing the migration of software components among servers that form a distributed software test environment.

2. Related Art

It is very common for a business enterprise that has used a given software application for some length of time to determine that it needs to modify the software, for any of a number of reasons. For example, the enterprise may need to enable the application to exchange data with another application, or wish to improve the quality, speed or ease-of-use of the user interfaces provided by the application, or to add altogether new capabilities to the application, etc. Where the application exists in a distributed software environment, as is the case with a tremendous amount of software in enterprises of any size, there is a consequent need to establish a well-defined software development process to ensure that the process of developing and testing the software improvements is conducted in an orderly fashion.

One approach is to adopt some form of versioning control of source code. This approach has been used reasonably satisfactorily in some instances, but its effectiveness is greatest where the software in question exists only on one computer, and dwindles quickly if used with distributed software. Especially when software resides in multiple servers, therefore, a migration plan is needed to manage the process of modifying software and of migrating the modifications from a test environment to a production environment. (By "production environment" is meant the environment in which the application will be in actual use as opposed to mere testing, and in particular the environment in which the application must function properly, and without unexpected problems that might interfere with the users of the application in their conduct of the enterprise's business).

In the development of a software enhancement, the development team may involve a relatively large number of people, who may not all work in the same place, or even in the same time zone. It is all too easy for one portion of such a team to make a modification to the software under development without the rest of the team being aware of what has been done. For example, without some form of versioning control, software components that are of a version different than a production version could exist simultaneously in plural test servers, causing errors and discrepancies during testing.

In addition, the potential is great for inconsistent modifications to be made, or that two portions of the team may both write modifications to one portion of the software, with both sets of modifications needing to be adopted in the final version. For example, a component being modified by one test team (call their work "job 1") and simultaneously by a second team (call their work "job 2") could result in the modifications by job 1 being rolled into production and then overwritten by job 2 when job 2 is rolled into production, with the result that the modifications made by job 1 would be lost. Therefore, there is a need to ensure that the changes to the component by job 1 are included in the changes to the component by job 2 and vice versa in such situations.

Moreover, if a given module or other component of an application is modified, then in testing the modified software it is important that the other software with which that modified portion interacts, is identical to what is used throughout the enterprise. If the test is conducted on a server where an outdated version of one relevant program is used, for example, various problems are apt to result. First, of course, since the modification will be intended to interact with the current version, the presence of the older version in the test server may produce errors or discrepancies in operation that would not occur with the current version, thus producing misleading test results, and requiring additional time in identifying the problem, and thus increasing the overall time required to have the modified component(s) ready to be introduced throughout the enterprise.

Conversely, the older version in the test server may actually interact well with the modified software where the current version would not, thus causing the test team to miss a problem until the modified software is eventually used with the current version of the other program. Since an occurrence of this sort may not be recognized until the modified software has been introduced into production, the resulting problems could be relatively serious ones in terms of their effect on the enterprise's efficiency.

Thus, it is also important to ensure that a new modification of software is tested in an environment that accurately represents the environment in which the modification will ultimately be used once it is approved.

Also, once a module or other component of the new software has been released for use by the enterprise (i.e., is no longer regarded as being in testing), it would be highly undesirable for a portion of the development team that for some reason had not been notified, or had not understood, that that component was no longer in testing, to continue writing modifications to that component, with consequent possible confusion.

Thus, multiple challenges are presented when managing the migration of software components during the software development process, and these challenges are greater when the software is developed and tested in a distributed test environment including a plurality of test servers and test teams.

For all these reasons, these development teams developing and testing software components need a reliable method for managing the migration of tested software components from the test environment to the production environment.

Accordingly, there is a need, not fulfilled by current versioning control tools, to ensure that the software components in each of plural test servers represent the production version except for the software components being tested.

Given the foregoing, what is needed is a system, method and computer program product for server migration synchronization.

BRIEF DESCRIPTION OF THE INVENTION

The present invention meets the above-identified needs by providing a system, method and computer program product for server migration synchronization.

An advantage of the present invention is that it prevents a software component from being modified by more than one project at a time.

Another advantage of the present invention is that it ensures that the software components in each of the test servers represent the production environment except for the software component(s) being tested at that time.

Features of the system, method, and computer program product for managing the migration of software components among a plurality of servers which form a distributed software test environment, include establishing the status of a software component in a server-A as "test" status to indicate that the software component is still in a development and testing stage, and updating the status of the software component from "test" status to "production" status when testing of that component is complete.

According to one aspect of the invention, the migration of a software component of an application through a distributed software test environment that comprises a plurality of servers, is managed as follows. A package containing at least one test component is defined, the test component being a modification of an existing software component of the application, and where the modification is to be tested. A test sequence is defined for the package, comprising at least one test environment in which the test component is to be tested. Where the test sequence includes more than one test environment, the order in which the test component is to be tested in those test environments is also specified. Three is stored in memory information relating to the package and information relating to the test sequence, and the test component is tested in accordance with the test sequence, using the information stored in the memory to manage performance of the testing.

A package can contain one or several test components, and several packages can be tested on the same server (test environment) at once, provided that the packages do not contain two different versions of any software component. One important aspect of the invention is the use of information identifying, for each package, which components in it are test components, and indicating the location and status of the package. Such information is also used to control when it is permitted to install a package on a given server, so as to ensure that the server does not have two inconsistent versions of any software component installed at the same time.

Another important feature of one aspect of the invention is providing a first user with a notification when a second user requests migration of the software component to one server, also in "test" status, while the status of the software component at a second server is "test" status, and notifying the second user that the first user has the software component in "test" status on the one server. These notifications inform all parties that the component is still in "testing" status, and help to prevent plural users or teams from accidentally both making changes to the same component. This, in turn, helps ensure that when the component does finally go to "production" status, the changes made to it are incorporated in all copies of the components.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 3A and 3B are illustrations of the rules governing migration from server to server according to an embodiment of the invention.

DETAILED DESCRIPTION

I. Overview

The present invention is directed to a system, method and computer program product for server migration synchronization.

Figure 1:
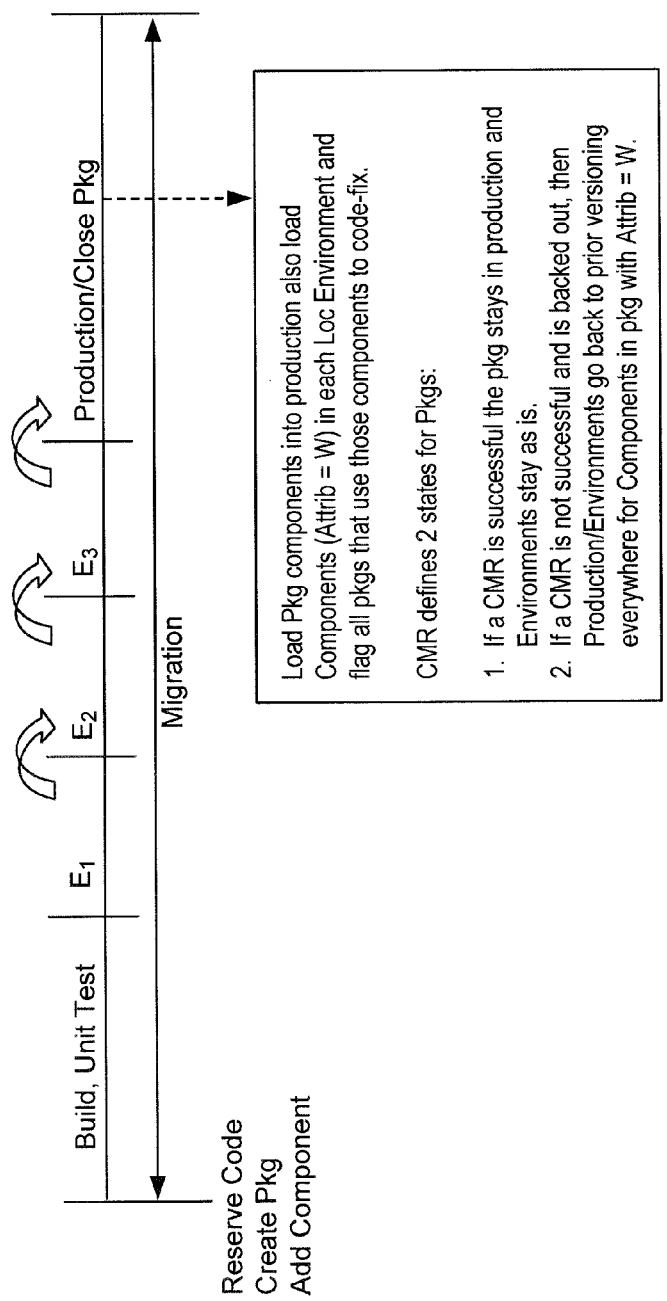
FIG. 1 is an illustration of the general process of testing a new software component using an embodiment of the invention.

FIG. 1 shows the general process of the invention. The programmer first reserves the component(s) it is intended to modify, so that others cannot work on the same component while the programmer is doing so (this in itself is straightforward, and so will not be described in detail). After writing the code for the modification(s), the programmer tests the modified software on a single computer (presumably, but not necessarily, the programmer's own workstation). Then, to test the new software in the environment(s) in which it is intended to be used, the programmer creates a software package that includes both the modified component(s) and any other components of the existing program that are needed in using the modified component(s).

In the illustration in FIG. 1, the programmer considers it necessary to test the new code in each of three environments E1-E3, each of which is represented by a respective server. As indicated by the arrows in that figure, the software package is loaded onto a first test server that represents first test environment E1. After testing in that environment is complete, the package is moved to second testing environment E2, and after being tested there, to environment E3. Upon completion of testing in this last test environment, each modified component in the package is now labeled "production", indicating that the testing thereof is complete, and that the modification(s) are to be considered as the current version of those components going forward. The package is now closed (that is, the testing of the package is now complete), and the modified components are loaded into each testing environment being used by the development team, so that testing of any further modifications to the application will be performed using the new, and now current, version of the component(s) the testing of which has now been completed. In addition, any other existing packages that use any of those components are flagged, so that the development team members will be sure to check that the modified version is used instead of the previous version. If the closed package is the only package that needs to be tested, the updated software components can now be distributed to the entire enterprise for use as the now current version.

If for any reason it becomes necessary to go back to the previous version of a package, then all the environments containing the package with the modified component(s) are restored to the previous version of each modified component in that package. For example, this is done if the test is a not fully successful, and it is determined that the modified component(s) cannot yet be used to replace the existing version.

The present invention is now described in more detail herein in terms of the above exemplary description. This is for convenience only and is not intended to limit the application of the present invention. In fact, after reading the following description, it will be apparent to one skilled in the relevant art(s) how to implement the following invention in alternative embodiments.

II. System

Figure 2:
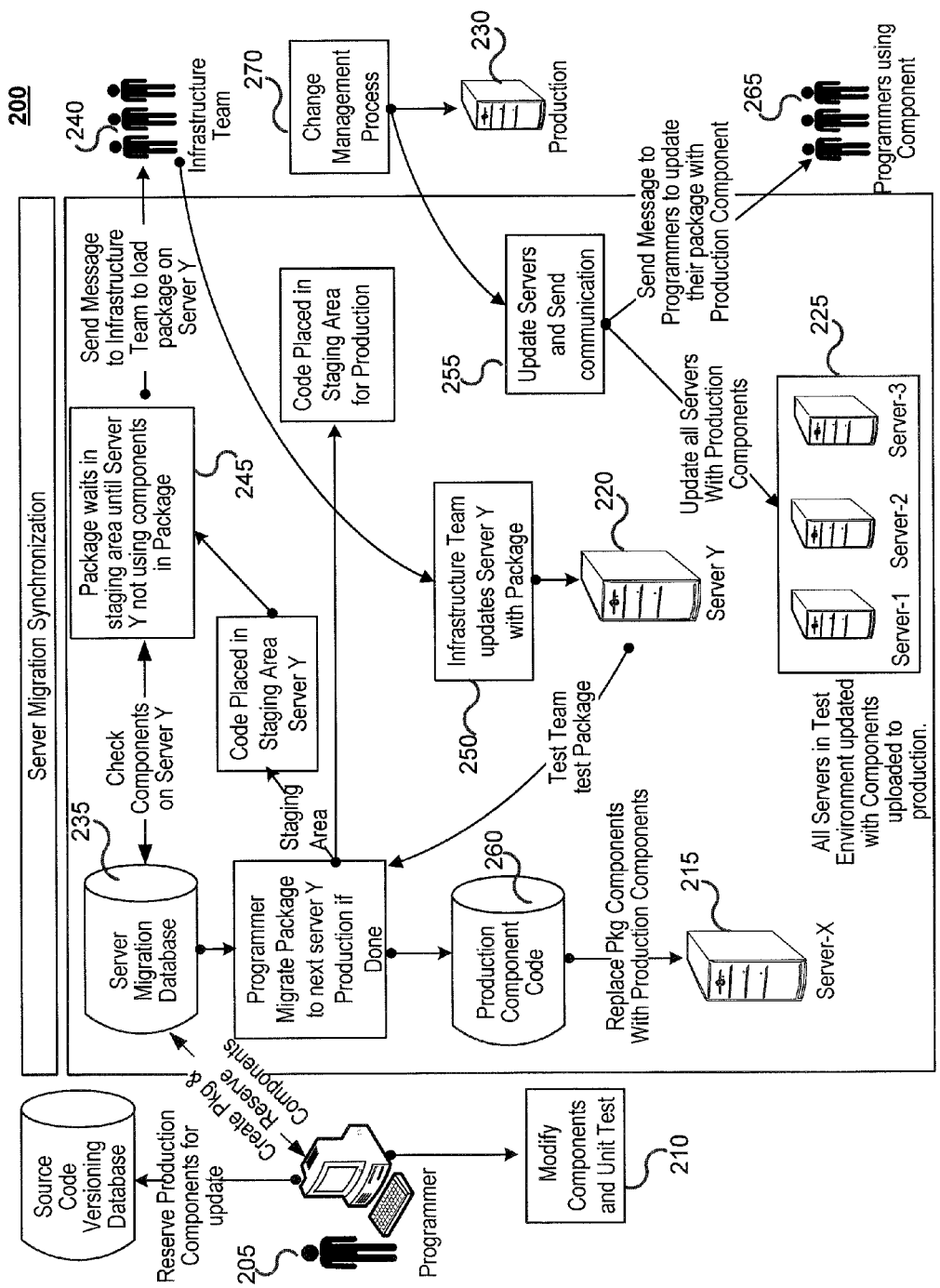
FIG. 2 is a schematic system diagram illustrating an embodiment of the invention.

Referring to FIG. 2, a system diagram of an exemplary server migration synchronization system 200 in which the present invention, in an embodiment, would be implemented is shown.

A programmer 205 who wishes to make a software modification, checks the relevant component(s) out from a source code versioning database 202, and makes the modification(s). By "checking out" is meant that the database now contains a flag or other indicator that the component(s) being worked on by programmer 205 are not available for modification by anyone else.

After making the modification(s), programmer 205 then performs any tests they wish of the modified software component locally (at 210). Once this has been completed satisfactorily, programmer 205 inserts the component(s) in question into the testing process. For this purpose, the components are loaded into a server migration database 235, from which they are taken as described below for testing in one or more test environments formed of test servers 215, 220 and 225, for example.

The server migration synchronization process 200 is an iterative process performed until the software component is assigned "production" status and is rolled into production, at 230. While production environment 230 is illustrated schematically by a server icon in FIG. 2, that environment actually represents the use of the software in the actual operations of the enterprise, as opposed to testing.

As the initial step in the server migration synchronization process 200 itself, programmer 205 creates a software package that contains the modified component(s) to be tested. The package includes both read-only ("read" status) components, which are not being tested but which are necessary for use in testing the modified component(s), and write ("test" status) software components, which are the component(s) being tested. A software component in "test" status is modifiable by programmer 205 if such proves to be necessary, but the component(s) in "read" status cannot be changed.

An infrastructure team 240 may handle the routing of the package. The routing schedule or list for the package has been provided either by programmer 205, or by another appropriate member of the development team, and lists the various servers on which it is deemed useful to test the package. By way of example, if the application being modified is one that is intended to be able to run on various operating systems, each of those servers might be one running on a different respective operating system. Again, if the application being modified is one that is intended to interact with several other applications, then the various test-environment servers might be ones where those other applications reside, either singly or in the various combinations that the modified application will have to be able to cooperate with in actual use.

Once the package is created, as mentioned, programmer 205 stores the software components in server migration database 235. In the example depicted in FIG. 2, the package is to be tested first in server X (215), and then in server Y (220). FIG. 2 essentially shows the process at a point where testing in server X (215) has been successfully completed, and testing is now to be performed at server Y (220). At this point, since server X (215) is now done using the test package, the components of that package are replaced in server X (215) with the production version of those components, that is, the version that is currently in use by the enterprise, and which the modified component(s) are intended to improve. Those production components have been stored at 260 during the testing at server X (215).

Before actually moving the package to server Y (220), infrastructure team 240 checks as to whether server Y (220) is ready to begin the test. If server Y (220) is currently performing a task that uses any of the components in the package, then the package is not permitted to be moved onto server Y (220). In such an instance the package is kept in a staging area 245, used as a repository for the package during the migration process.

If server Y (220) is not using any of the components that are in the package, and is free to perform testing on the pending package, programmer 205 is notified, and infrastructure team 240 moves the pending package to server Y (220) for testing (at 250).

Once testing of the package at server Y (220) has been completed, the package is returned to staging area 245 until the next server (if any) on the routing list is available to test the package. Assuming that the next listed server is not using any of the components in the package, infrastructure team 240 moves the pending package to that next listed server for further testing.

The migration routing list concludes with "production" as the last-listed server. Thus, if a check of that list indicates that the next listed server is production 230, then the testing of the pending package is complete. At this juncture, the status of the write components in the package can be changed from "testing" to "production", and the code is stored in another staging area 268. At a convenient time, the production code is distributed to the servers throughout the enterprise (at 255), including all the servers 215, 220 and 225 in the test environment, and a message is sent to those programmers 265 in the development team who are using the component(s) in question, to update any package they are working on that contains any of the component(s) that have been moved to "production" status. This message may be sent manually by programmer 205, but it is preferred that the message is generated and sent automatically upon the components that have been modified, being checked back in to database 202 by programmer 205.

The "production" status of the modified component(s) is indicated in source code versioning database 202, and serves to indicate that those components have been updated in some fashion, and that the updated version is now in use. Accordingly, if other members of the development team have tasks that will require them to modify any of those components, they are now free to check the components they need to work on out from database 202.

Several aspects of the processing performed in this embodiment, will now be discussed in greater detail.

FIG. 3A illustrates an example in which the application being modified contains a number of components, including at least $C_1$ through $C_7$ The programmer 205 has prepared modifications of three of those components, $C_2$, $C_3$ and $C_5$, has completed unit testing thereof, and wishes to test those modification in the actual production environment (as explained above, that is simply the environment in which the software is actually used by the enterprise). In this example, the programmer 205 determines that to test $C_2$, it will be necessary to define a package Pkg1 that includes $C_1$ and $C_4$ as well as $C_2$. (The process by which the programmer 205 goes about creating this package is described below.) It is intended to test Pkg1 in two test environments, E1 and E2.

In Pkg1, only component $C_2$ is in "test" (W) status. If the testing of this package shows that revision is needed, the programmer 205 can make further modifications to the code in component $C_2$, but not to that in $C_1$ or $C_4$. This package can then be re-tested to see if the revisions have solved the problem.

To test component $C_2$, another package Pkg2 is needed that includes C3, and also $C_5$. Again, only $C_3$ is in test status, and $C_5$ cannot be modified in this package. Importantly, although the programmer has created a modification of component $C_5$, the testing of the modification of component $C_3$ will be conducted using the existing, not the modified, version of $C_5$. This package is intended to be tested in environments E1 and E2, also.

The programmer 205 prepares a third package, Pkg3, to test $C_5$. This package, also to be tested at least in environment E2, contains components $C_5$, in test status, and $C_6$, which cannot be modified.

Suppose that packages Pkg1 and Pkg2 have been successfully tested in environment E1, and are ready to be tested in environment E2. Since there is no component that is common to Pkg1 and Pkg2, these two packages can be tested in the same environment concurrently. Pkg3, however, contains one component, $C_5$, that is also present in Pkg2. These two packages, therefore, cannot be tested on the same server at the same time. Supposing that Pkg3 is now being tested in environment E2, it is not permitted for any other package containing either $C_5$ or $C_6$ to migrate to that server at present. Pkg1, however, can be moved to E2 for testing.

Figure 3B:
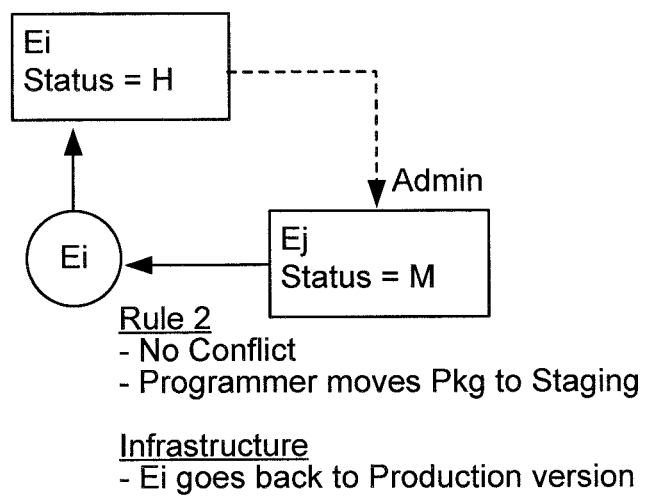

Once the testing of Pkg3 on the server in environment E2 is complete, and Pkg3 has been removed from that server, and replaced with the existing production versions of the components $C_5$ and $C_6$, it will be permitted to migrate Pkg2 to environment E2, as illustrated in FIG. 3B.

Naturally, if it is necessary to test two modified components together, this can be done, in several ways. First, if it is desired to test the modifications to C3 and $C_5$ together, then after Pkg2 and Pkg3 have been tested successfully, and one of those packages (say, Pkg3) has been moved into production status, then the other of those packages can be re-tested on the necessary environments, where the fully-tested package has now been installed permanently. Alternatively, the programmer 205 can create another package containing, perhaps $C_3$, in test status, and $C_5$ (new version) and $C_6$, both in read-only status, and run this new package through the testing in the necessary test environments. It is also within the scope of the invention, however, to permit the creation and testing of a package that includes plural modified components. That is, it would be permitted to define a single package containing $C_3$ and $C_5$ in test status, and $C_6$ in read-only status.

The process of the preferred embodiment will now be described. It is assumed, for this description, that the programmer 205 has performed whatever unit testing is desired.

Figure 5:
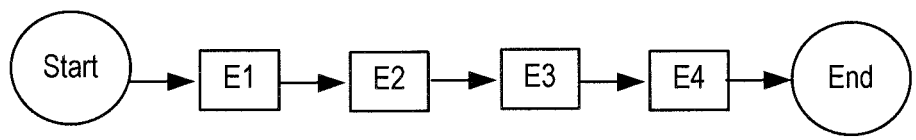
FIG. 5 is a chart illustrating the overall test environment, with examples of test paths for different packages.

For each modified software component, the programmer 205 must construct a package containing the modified component, and determine which test environments to test the package in. FIG. 5 illustrates an example in which four potential test environments exist. One modified component may need to be tested in each of environments E1 through E3, while another component may only need to be tested in E2 and E3.

Figure 6:
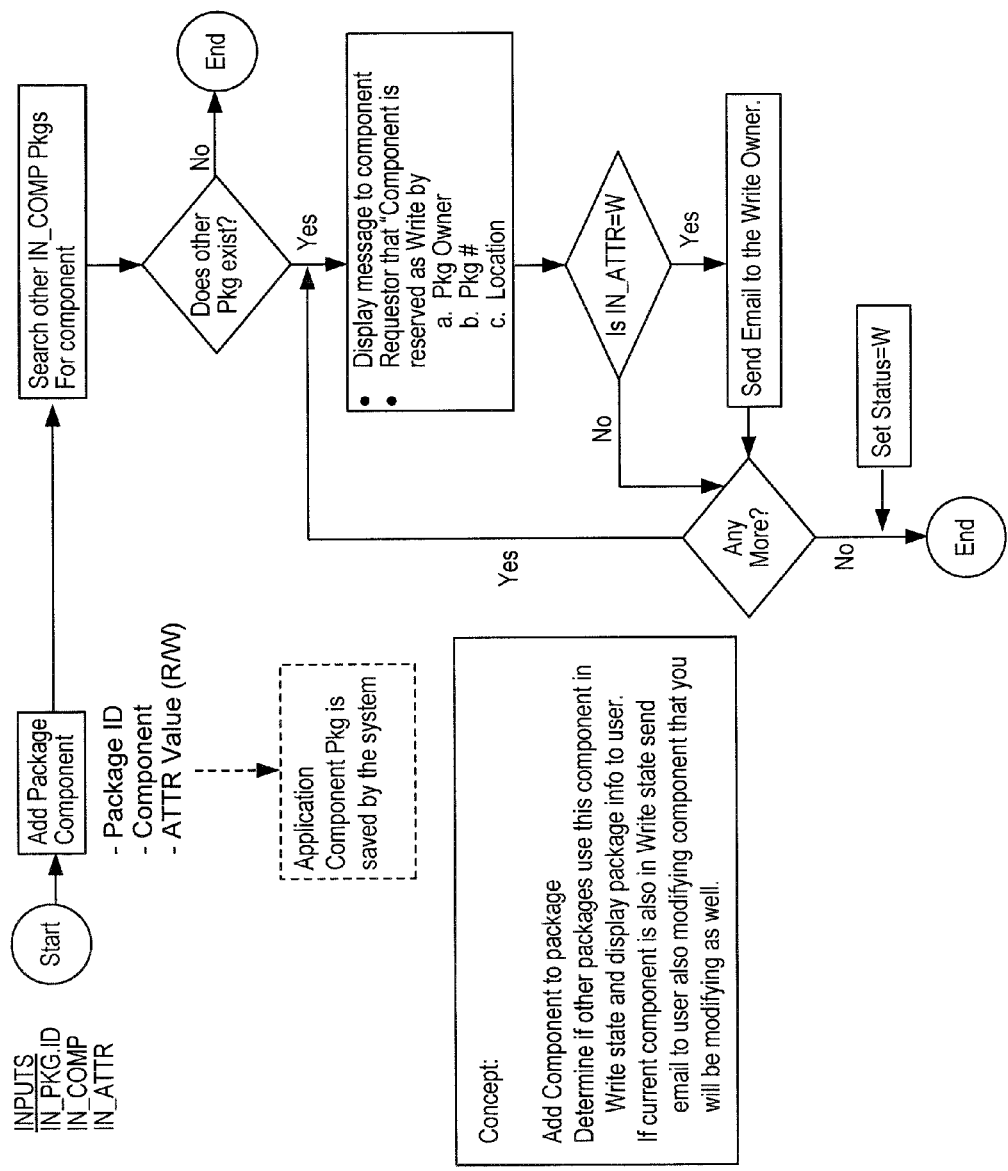
FIG. 6 is a flowchart illustrating the creation of a software package for testing according to an embodiment of the invention.

The actual construction of a package is illustrated in the flowchart of FIG. 6. The programmer 205 begins by defining a new package in the migration database 235, by assigning a Package ID. (The programmer 205 can access an existing package to add a component, by means of inputting the Package ID of the existing package.) The programmer 205 identifies the components that are to be parts of this package, and assigns to each a status, either "test" ("W"), or "read-only" ("R"). As mentioned above, the component(s) that are being tested by means of this package are the ones with status W, and there may be more than one such component (an example of such a case is shown in FIG. 7).

A check is now made for the existence of other packages in the database that contain a component, common to this package, and whether any such common components have status "W". If so, the programmer must send an e-mail to the "owner" of that component, that is, the programmer who has reserved the component in question, in "test" status. While it is within the broad scope of the invention for the programmer 205 to do this manually, it is preferred that the database 235 provides the programmer 205 with a prompt to send the e-mail, or even better, prohibits the programmer 205 from proceeding, until the e-mail has been sent.

Figure 7:
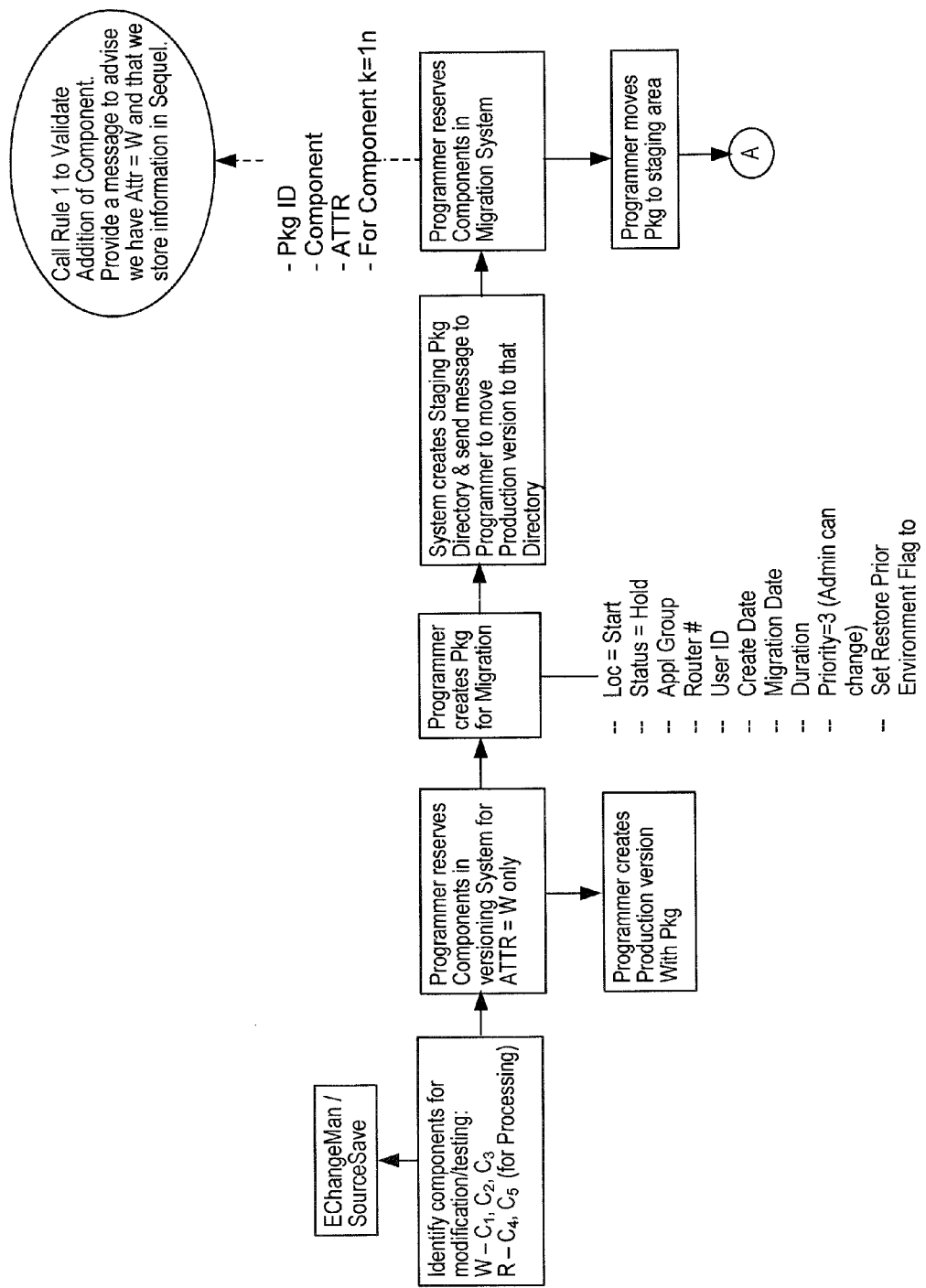
FIGS. 7 and 8 are a chart illustrating the creation and migration of a software package through the testing environment according to an embodiment of the invention.
Figure 8:
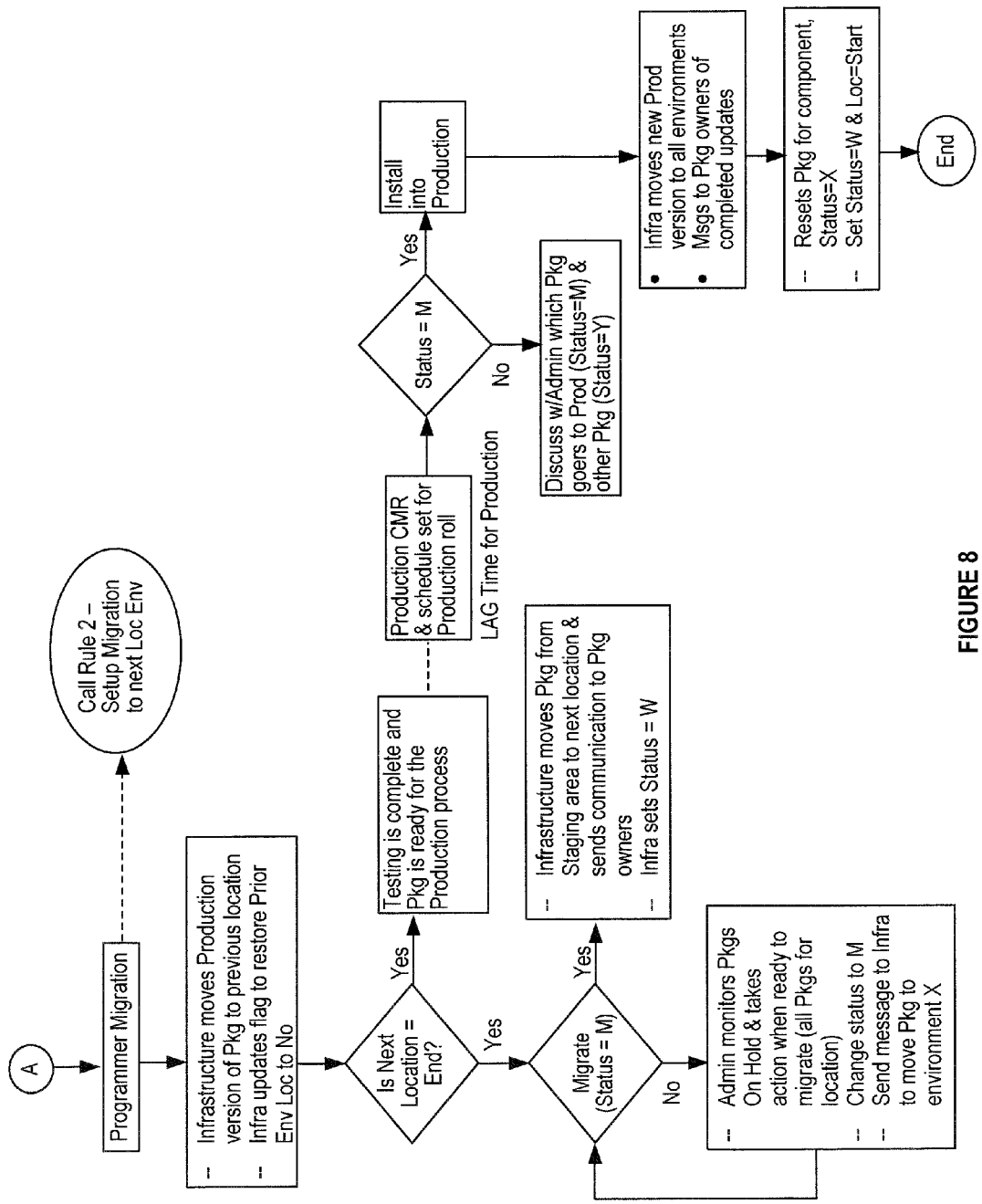

Examples of additional information entered in connection with the creation of a package are shown in FIG. 7, and include the package location, its status, the application group to which it pertains, a router number, the user ID of the programmer 205 who created the package, the create date, the date of each migration of this package, the duration of each migration (that is, the time the package is to remain in each test environment), and a priority level. The uses of these will become more apparent from the description below.

The system creates a Staging Package Directory, and instructs the programmer 205 to move the Production version of the components in question to that Directory. The programmer reserves each component in the package, in the system, supplying the package ID, the component identifier, and its attribute (status). The programmer then moves the package to the staging area, and the actual migration process begins.\

Figure 4:
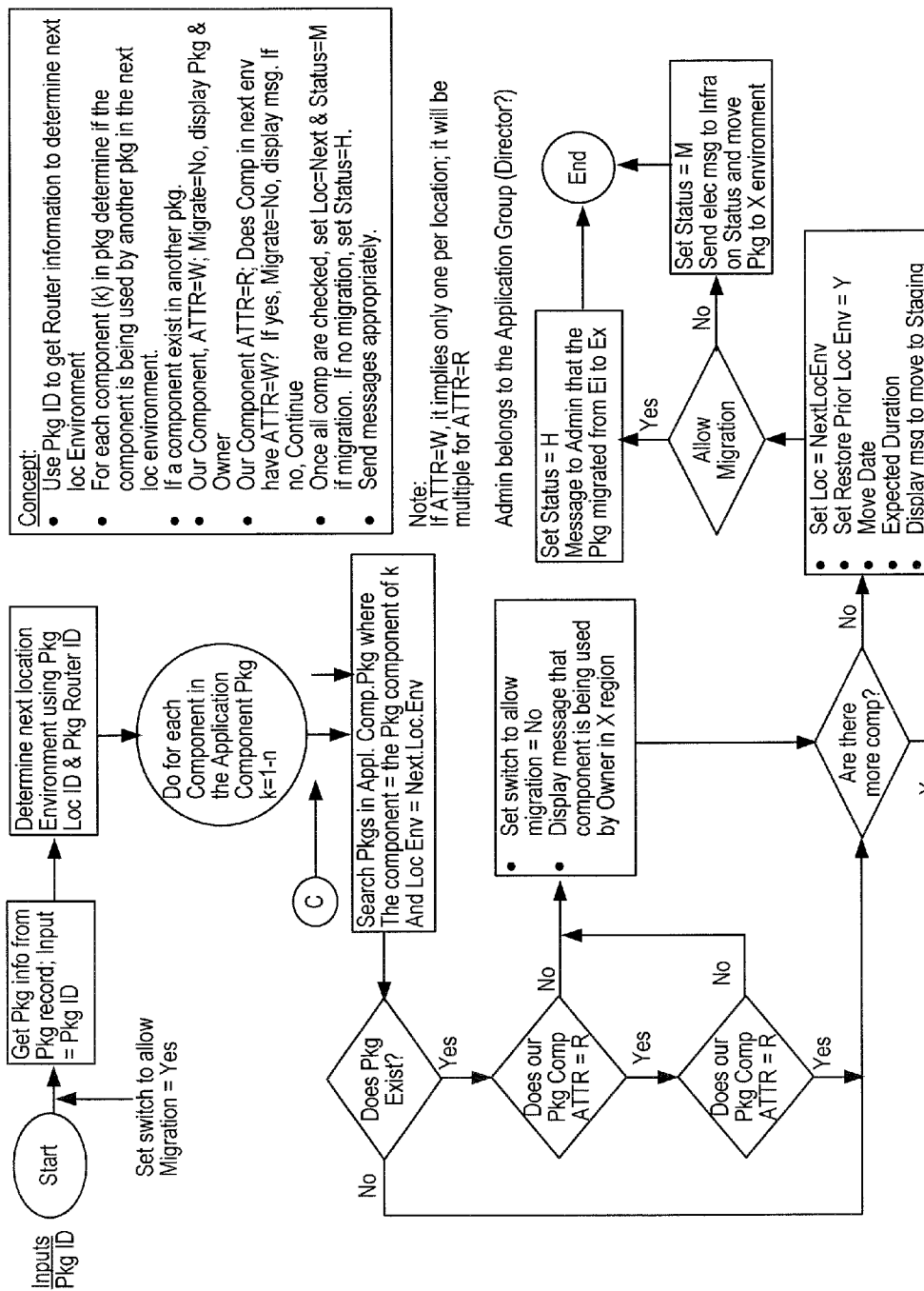
FIG. 4 is a chart illustrating the process of migration from server to server.

As illustrated in FIG. 4, the package ID is used to identify the routing information for this package, to determine which test environments it is to go to, and in which order. To avoid possible conflicts, the system checks, for each component in the package, whether the next environment in the list is using any of the components in the package, and if so, whether the component in question is one whose attribute in the package is read-only. If the next test environment is using a component that is present in the package with "test" status, then migration of the package to that test environment is not permitted at present, and a switch is set to prohibit migration. A message is displayed (to the infrastructure team 240, the programmer 205, or both) that that component is being used in that test environment.

At this time, the date for migration of this package to the test environment can be changed, and the package is moved to the staging area, as described above, to wait. By "date" is not necessarily meant a different day of the calendar, and can simply be a new time, later the same day.

Once the new migration date arrives, and assuming migration of the package to the test environment is now permitted, the infrastructure team 240 now moves the package to the test environment, and a message to the effect that migration has now been performed, is sent.

It may occur that two packages may be slated for testing at the same time in the same environment. If there is no conflict between the packages, then concurrent testing is permitted, thus affording great flexibility and convenience in the rapid testing and deployment of software modifications. In a situation where two or more such packages share a component so that concurrent testing is not possible, the priority levels assigned to the respective packages can be sued by the system automatically to determine which package will be tested first. Alternatively, of course, an administrator may make this determination manually upon being apprised of the conflict, and this can be done also where two or more such packages have identical priority levels.

Once the testing in that environment is done, and the package has migrated to the next test environment prescribed by its routing information, the infrastructure team 240 restores the components in the first environment, to their previous (pre-test) version (see FIG. 7).

This process is repeated until the package has been tested in all the test environments prescribed for it. At this point, the next location in the package's routing information is "end", signifying that if the testing has been successful, the package is ready to be adopted as the production version. Roll-out is scheduled, taking into account administrative or other priorities, and at the appointed time is performed, with the new version of the modified component(s) in the package being installed throughout the servers of the enterprise where the new version is to be used.

Figure 9:
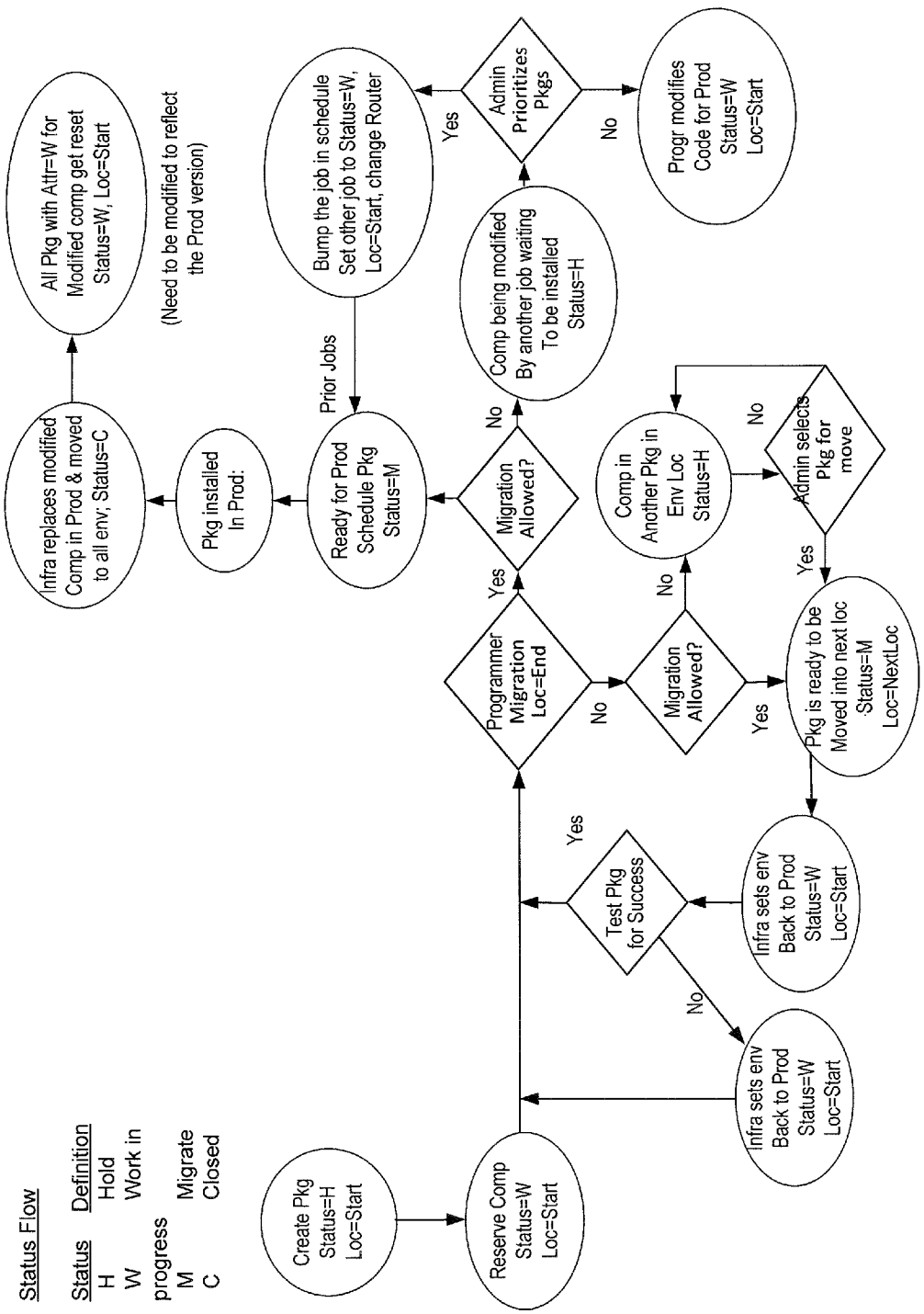
FIG. 9 illustrates the use of the Status attribute according to an embodiment of the invention.
Figure 10:
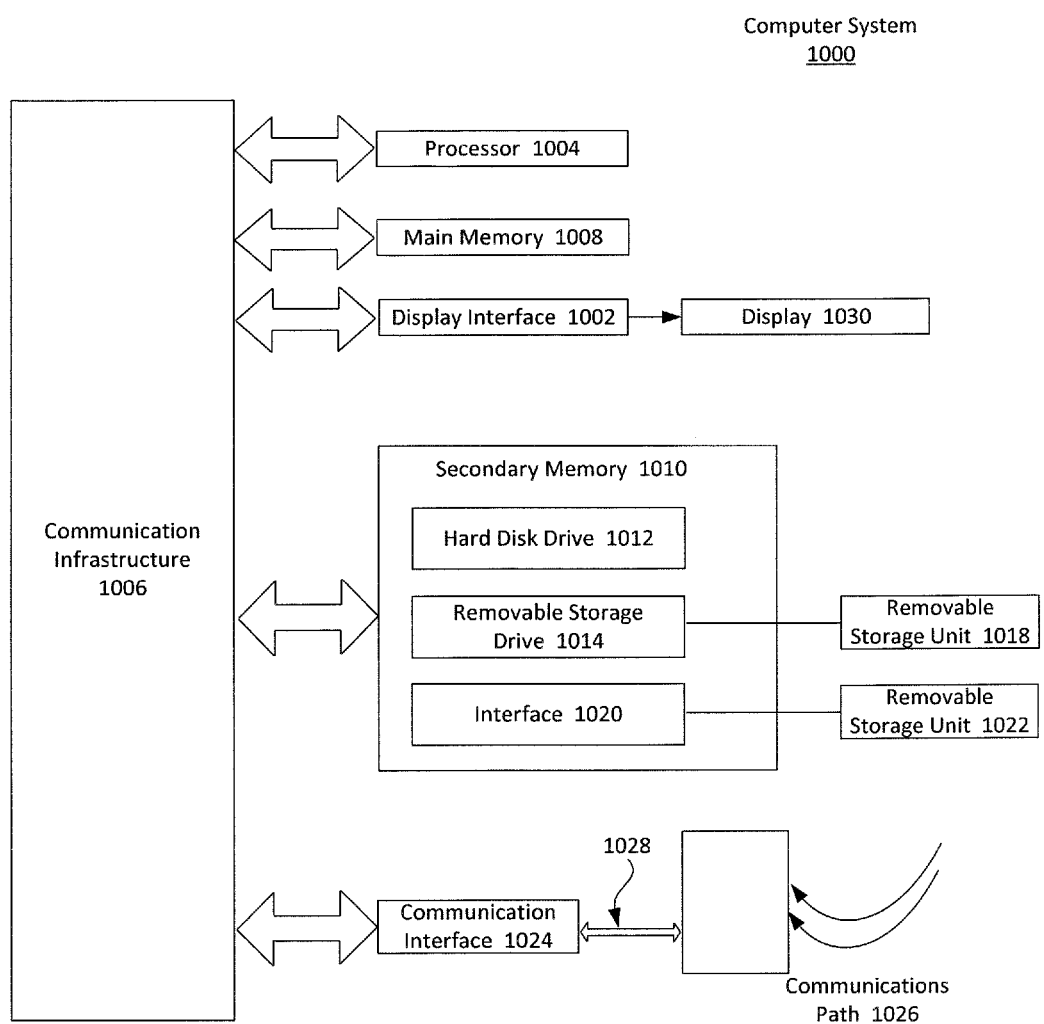
FIG. 10 is a block diagram of an exemplary computer system useful for implementing the present invention.

FIG. 9 illustrates how the status of a package changes as the package moves through the testing process. As can be seen, the statuses used include "hold", when the package is in a staging area awaiting migration to the next test environment; "work in progress", indicating that the package is being tested in one of the test environments; "migrate" indicate that migration of the package is in progress; and "closed", assigned to the package after the package has successfully completed testing and has been installed as the new production version, in all environments.

In the embodiment described above, once a package has completed testing at one test environment, for example E3, the components of the package are replaced in E3 by what was present prior to migration of the package to that environment. That is, the environment E3 is restored to its pre-test state. The modified component(s) in the package are permanently installed at E3 later, once the fully tested package is accepted for production, and installed throughout all environments. In a variation of that approach, it is also within the scope of the invention to permit the test environment E3 where the package has been tested successfully, to retain the package of software going forward, even though the package is still being tested in other environments. If subsequent testing is unsuccessful, however, or if for any other reason it is decided not to roll that package out into production, then environment E3 must be restored to its state before the testing of the package.

III. Example Implementations

The present invention (i.e., system 200 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general-purpose digital computers or similar devices.

In fact, in one embodiment, the invention is directed toward one or more computer systems capable of carrying out the functionality described herein. An example of a computer system 1000 is shown in FIG. 2.

The computer system 1000 includes one or more processors, such as a processor 1004. Processor 1004 is connected to a communication infrastructure 1006 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1000 can include a display interface 1002 that forwards graphics, text, and other data from the communication infrastructure 1006 (or from a frame buffer not shown) for display on the display unit 1030.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018 represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000. The databases referred to above may reside in any of the memories mentioned, according to convenience, and may be managed by processor 1004.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (e.g., channel) 1026. This channel 1026 carries signals 1028 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1014, a hard disk installed in hard disk drive 1012, and signals 1028. These computer program products provide software to computer system 1000. The invention is directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features of the present invention, as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A method, comprising:
receiving, by a computer-based system configured to perform software component migration, information indicating a first software package is to be tested in a plurality of test environments, wherein the first software package includes a modified test version of a particular software component;
the computer-based system determining that a first computer system in the plurality of test environments is currently executing a process that uses the particular software component but that a second computer system in the plurality of test environments is not currently executing any processes that use the particular software component;
in response to the determining, the computer-based system deploying the first software package to the second computer system for testing and implementing a prohibition on deployment of the first software package to the first computer system;
the computer-based system lifting the prohibition based on received information indicating the process on the first computer system is no longer executing; and
replacing, by the computer-based system, the modified test version of the particular software component with a production component in each of a plurality of test environments.

2. The method of claim 1, wherein a test sequence for the first software package comprises an order in which the modified test version of the particular software component is to be tested in a plurality of computer systems corresponding to the plurality of test environments.

3. The method of claim 1, further comprising labeling, by the computer-based system and in response to completion of a test sequence, the particular software component as a production component.

4. The method of claim 1, further comprising testing, by the computer-based system, the modified test version of the particular software component in accordance with a test sequence, wherein the test sequence specifies testing the first software package on the first and second computer systems.

5. The method of claim 1, wherein the first software package and a second software package have respective priority levels, and wherein an order of testing the first and second software packages is based on the respective priority levels of the packages.

6. The method of claim 1, further comprising notifying, by the computer-based system, an owner of the modified test version of the particular software component that a different modification of the particular software component exists.

7. The method of claim 1, further comprising the computer-based system deploying the first software package to the first computer system in response to the prohibition being lifted;
wherein replacing the modified test version with a production component is performed subsequent to testing of the first software package on the first and second computer systems.

8. The method of claim 1, further comprising the computer-based system storing the first software package in a staging area based on the prohibition.

9. The method of claim 8, further comprising:
the computer-based system removing the first software package from the staging area to deploy it to the first computer system; and
subsequent to testing of the first software package being completed on the first computer system, the computer-based system returning the first software package to the staging area prior to deploying the first software package to a third computer system for testing.

10. A system configured to perform software component migration, comprising:
a processor; and
a non-transitory computer-readable medium having stored thereon instructions that are executable to cause the system to perform operations comprising:
receiving information indicating a first software package is to be tested in a plurality of test environments, wherein the first software package includes a modified test version of a particular software component;
determining that a task executing on a first computer system in the plurality of test environments prevents deployment of the modified test version of the particular software component to the first computer system, but that no tasks executing on a second computer system in the plurality of test environments prevent deployment of the modified test version of the particular software component to the second computer system;
based on the determining, deploying the first software package to the second computer system for testing and prohibiting deployment of the first software package to the first computer system until after the task is completed; and
subsequent to the task completing, deploying the first software package to the first computer system.

11. The system of claim 10, wherein the operations further comprise storing the first software package in a staging area until after the task is completed.

12. The system of claim 10, wherein the operations further comprise deploying the first software package to a third computer system in the plurality of test environments in response based on a testing schedule indicating the first software package is to be tested on the third computer system subsequent to testing the first software package on the first and second computer systems.

13. The system of claim 10, wherein the operations further comprise changing a status of the particular software version from a test status to a production status subsequent to deployment of the first software package to the first and second computer systems.

14. The system of claim 10, wherein deploying the first software package to the first computer system is performed in response to a command from an authorized user.

15. An article of manufacture comprising a non-transitory computer-readable medium having stored thereon instructions that are executable to cause a computer system to perform operations comprising:
receiving information indicating a first software package is to be tested in a plurality of test environments, wherein the first software package includes a modified test version of a particular software component;
determining that a first computer system in the plurality of test environments is currently executing a process that uses the particular software component but that a second computer system in the plurality of test environments is not currently executing any processes that use the particular software component;
in response to the determining, deploying the first software package to the second computer system for testing and implementing a prohibition on deployment of the first software package to the first computer system;
lifting the prohibition based on received information indicating the process on the first computer system is no longer executing; and
replacing the modified test version of the particular software component with a production component in each of a plurality of test environments.

16. The article of manufacture of claim 15, wherein the production component is a version of the particular software component that is earlier than the modified test version.

17. The article of manufacture of claim 15, wherein the operations further comprise storing the first software package in a staging area based on the prohibition.

18. The article of manufacture of claim 17, wherein the operations further comprise:
removing the first software package from the staging area to deploy it to the first computer system; and
subsequent to testing of the first software package being completed on the first computer system, returning the first software package to the staging area prior to deploying the first software package to a third computer system for testing.

* * * * *